(12) United States Patent
Yang et al.

(10) Patent No.: US 10,778,821 B1
(45) Date of Patent: Sep. 15, 2020

(54) ELECTRONIC DEVICE

(71) Applicant: BEIJING XIAOMI MOBILE SOFTWARE CO., LTD., Beijing (CN)

(72) Inventors: Jieming Yang, Beijing (CN); Gaocai Han, Beijing (CN); Xuehu Zhang, Beijing (CN); Hongzhi Jin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/587,604

(22) Filed: Sep. 30, 2019

(30) Foreign Application Priority Data

Apr. 26, 2019 (CN) .......................... 2019 1 0344114

(51) Int. Cl.
  *H04B 1/38* (2015.01)
  *H04M 1/02* (2006.01)
(52) U.S. Cl.
  CPC ....... *H04M 1/0268* (2013.01); *H04M 1/0237* (2013.01); *H04M 1/0264* (2013.01); *H04M 1/0272* (2013.01)
(58) Field of Classification Search
  CPC ............. H04M 1/0235; H04M 1/0237; H04M 1/0239; H04M 1/0243; H04M 1/0268; H04M 1/0264; H04M 1/0272
  See application file for complete search history.

(56) References Cited

U.S. PATENT DOCUMENTS 7,480,524 B2 * 1/2009 Moon ................. H04M 1/0237
                                                                455/575.4
2018/0007182 A1    1/2018 Lin
2018/0198896 A1    7/2018 Kang et al.
2019/0302841 A1 * 10/2019 Sun ........................ G06F 1/1626
2019/0317550 A1 * 10/2019 Kim ....................... G06F 1/1677

FOREIGN PATENT DOCUMENTS

| CN | 108322571 A  | 7/2018  |
| CN | 208386629 U  | 1/2019  |
| EP | 3255867 A1   | 12/2017 |
| EP | 3322159 A1   | 5/2018  |

OTHER PUBLICATIONS

Supplementary European Search Report in the European Application No. 19204313.1, dated Jan. 7, 2020, (7p).

* cited by examiner

*Primary Examiner* — Tuan Pham

(74) *Attorney, Agent, or Firm* — Arch & Lake LLP

(57) ABSTRACT

Provided is an electronic device, including a body and a flexible display. The body includes a first surface, a second surface, and a lateral surface. The first surface and the second surface are opposite to each other and the lateral surface is adjacent to the first surface and the second surface. The flexible display includes a first display portion and a second display portion that are integrated. The flexible display is switchable between a retracted state and a sliding-out state. When the flexible display is in the retracted state, the first display portion covers the first surface and the lateral surface, and the second display portion covers the second surface. When the flexible display is switched from the retracted state to the sliding-out state, the first display portion slides in a direction where a free end thereof gets close to the lateral surface to expose a hidden region of the first surface.

18 Claims, 12 Drawing Sheets

ELECTRONIC DEVICE

CROSS-REFERENCE TO RELATED APPLICATIONS

This application is filed based upon and claims priority to Chinese Patent Application No. 201910344114.0, filed on Apr. 26, 2019, the entire contents of which are incorporated herein by reference.

TECHNICAL FIELD

The present disclosure generally relates to the technical field of terminals, and more particularly to an electronic device.

BACKGROUND

At present, a display screen of an electronic device is arranged on one surface of the electronic device only. However, other components such as a camera, an ambient light sensor, and a receiver are further required to be arranged on the surface, and thus an assembling space of the display screen is required to be preempted, which is unfavorable for increasing a screen-to-body ratio.

SUMMARY

This summary is provided to introduce a selection of aspects of the present disclosure in a simplified form that are further described below in the Detailed Description. This summary is not intended to identify key features or essential features of the claimed subject matter, nor is it intended to be used to limit the scope of the claimed subject matter According to a first aspect of the present disclosure, an electronic device is provided, which may include: a body, including a first surface and second surface that are opposite to each other, as well as a lateral surface, the lateral surface being adjacent to the first surface and the second surface; and a flexible display, including a first display portion and second display portion that are integrated, the flexible display being switchable between a retracted state and a sliding-out state, wherein, when the flexible display is in the retracted state, the first display portion may cover the first surface and the lateral surface, and the second display portion may cover at least part of the second surface; and when the flexible display is switched from the retracted state to the sliding-out state, the first display portion may slide along a direction where a free end thereof capable of getting close to the lateral surface to expose a hidden region of the first surface.

The above general descriptions and detailed descriptions below are only examples and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to example embodiments, examples of which are illustrated in the accompanying drawings. The following description refers to the drawings in which the same numbers in different drawings represent the same or similar elements unless otherwise represented. The implementations set forth in the following description of example embodiments do not represent all implementations matched with the present disclosure. Instead, they are merely examples of apparatuses and methods matched with aspects related to the present disclosure as recited in the appended claims.

The terminology used in the present disclosure is for the purpose of describing particular embodiments only and is not intended to limit the present disclosure. As used in the present disclosure and the appended claims, the singular forms "a", "an" and "the" are intended to include the plural forms as well, unless the context clearly indicates otherwise. It shall also be understood that the term "and/or" used herein is intended to signify and include any or all possible combinations of one or more of the associated listed items.

It is to be understood that "first," "second," and similar terms used in the specification and claims of the present application are not to represent any sequence, number or importance but only to distinguish different parts. Likewise, similar terms such as "one" or "a/an" also do not represent a number limit but represent "at least one". Unless otherwise pointed out, terms like "front portion", "rear portion", "lower portion" and/or "upper portion" are only for convenient description but not limited to a position or a spatial orientation. Terms like "include" or "contain" refer to that an element or object appearing before "include" or "contain" covers an element or object and equivalent thereof listed after "include" or "contain" and does not exclude another element or object. Similar terms such as "connect" or "interconnect" are not limited to physical or mechanical connection, and may include electrical connection, either direct or indirect.

The embodiments of the present disclosure are described below in combination with the accompanying drawings in detail. Characteristics in the following embodiments and implementation modes may be combined without conflicts.

In the present embodiment, an electronic device is a mobile phone. The electronic device may also be a tablet computer or other intelligent mobile devices with a display function.

Figure 1:
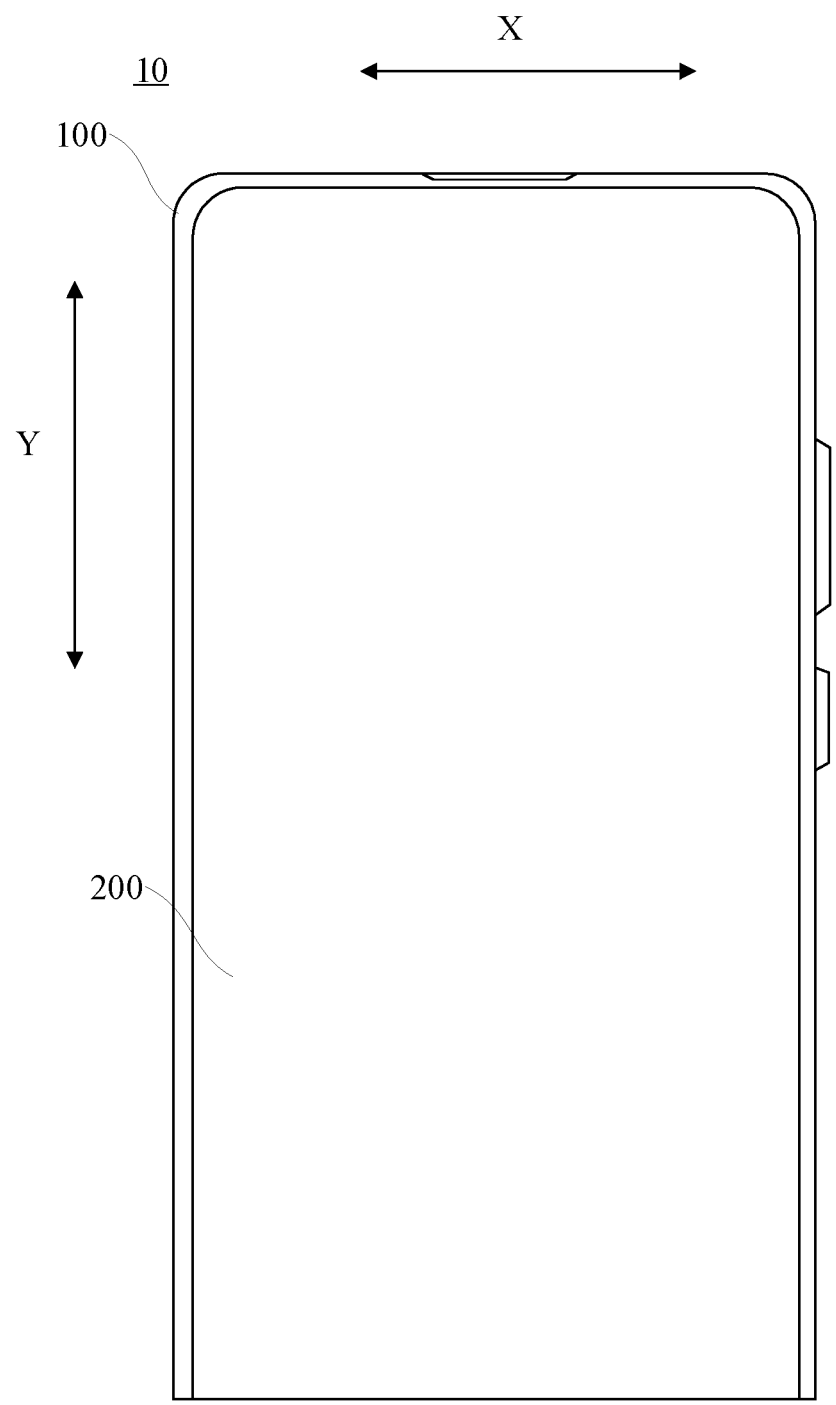
FIG. 1 is a schematic diagram of a front view of an electronic device, according to an embodiment of the present disclosure.
Figure 2:
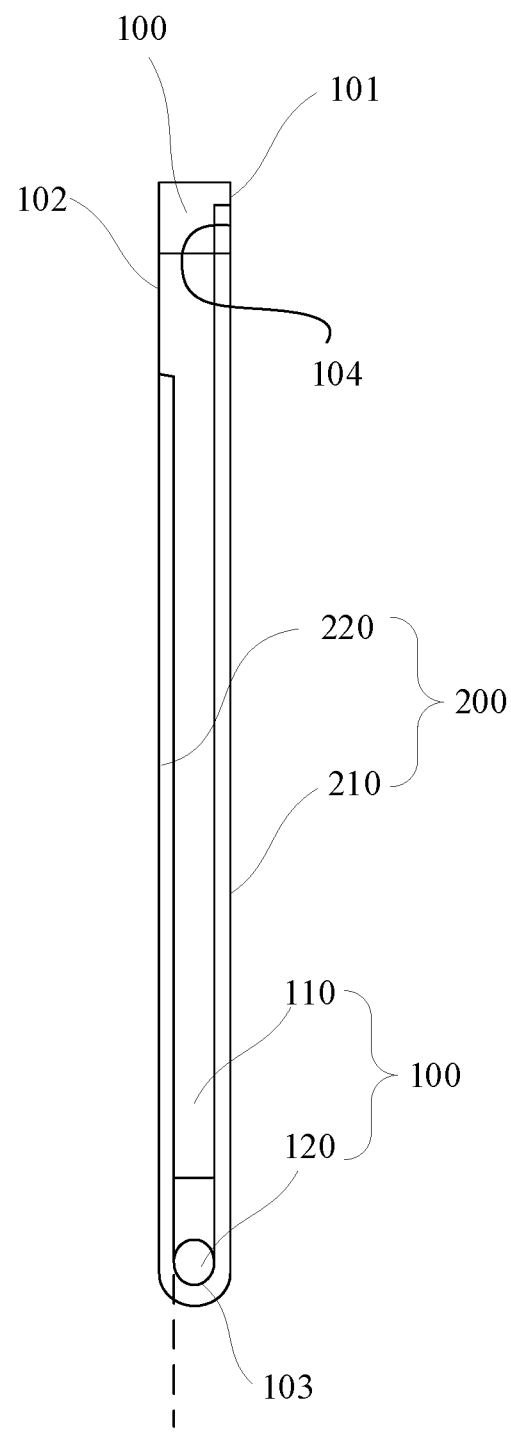
FIG. 2 is a schematic diagram of a side view of an electronic device, according to an example embodiment.

FIG. 1. is a schematic diagram showing the front of an electronic device in a retracted state 10. The electronic device includes a body 100 and a flexible display 200. The device and its components can be oriented in the width direction X and the length direction Y (as shown in the figure). FIG. 2 is a schematic diagram showing a side view of an electronic device in a retracted state 10. The body 100 may include a first surface 101, a second surface 102, a lateral surface 103, a hidden region 104, a main body 110, and a moving body 120. The first surface 101 and the second surface 102 may be opposite to each other, the lateral surface 103 may be adjacent to the first surface 101 and the second surface 102, and the hidden region 104 may be on the same side as the first surface 101. The flexible display 200 may include a first display portion 210 and a second display portion 220 that are integrated. The display portions 210 and 220 are separated at the dash line shown in FIG. 2. Main body 110 and moving body 120 may be adjacent or coupled. Surfaces of the main body 110 form the first surface 101 and the second surface 102. A surface of the moving body 120 forms the lateral surface 103.

Figure 3:
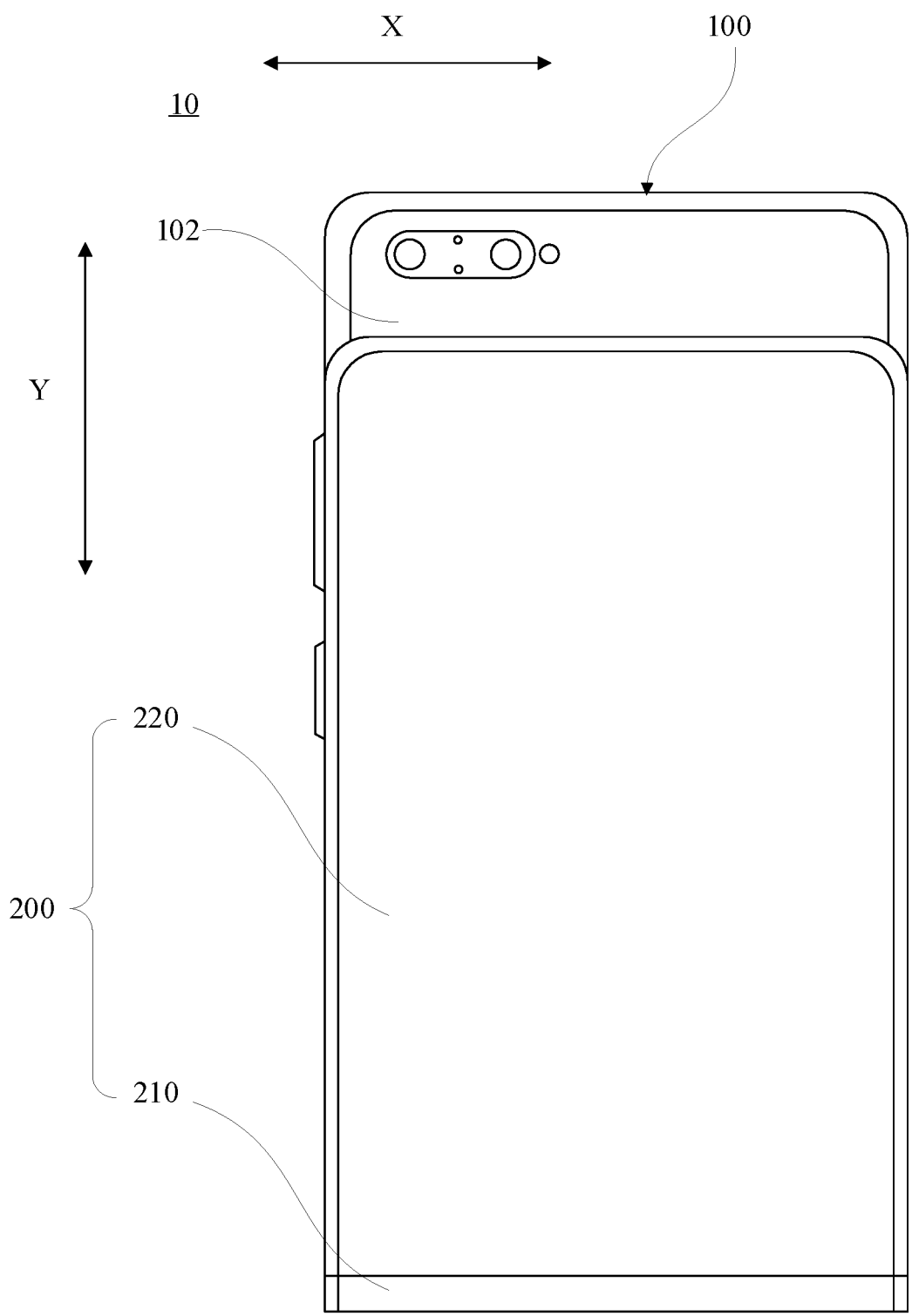
FIG. 3 is a schematic diagram of a rear view of an electronic device, according to an example embodiment.

FIG. 3 is a schematic diagram showing the back of an electronic device in a retracted state 10. The device can include a camera on the second surface 102 (as shown in figure).

Figure 4:
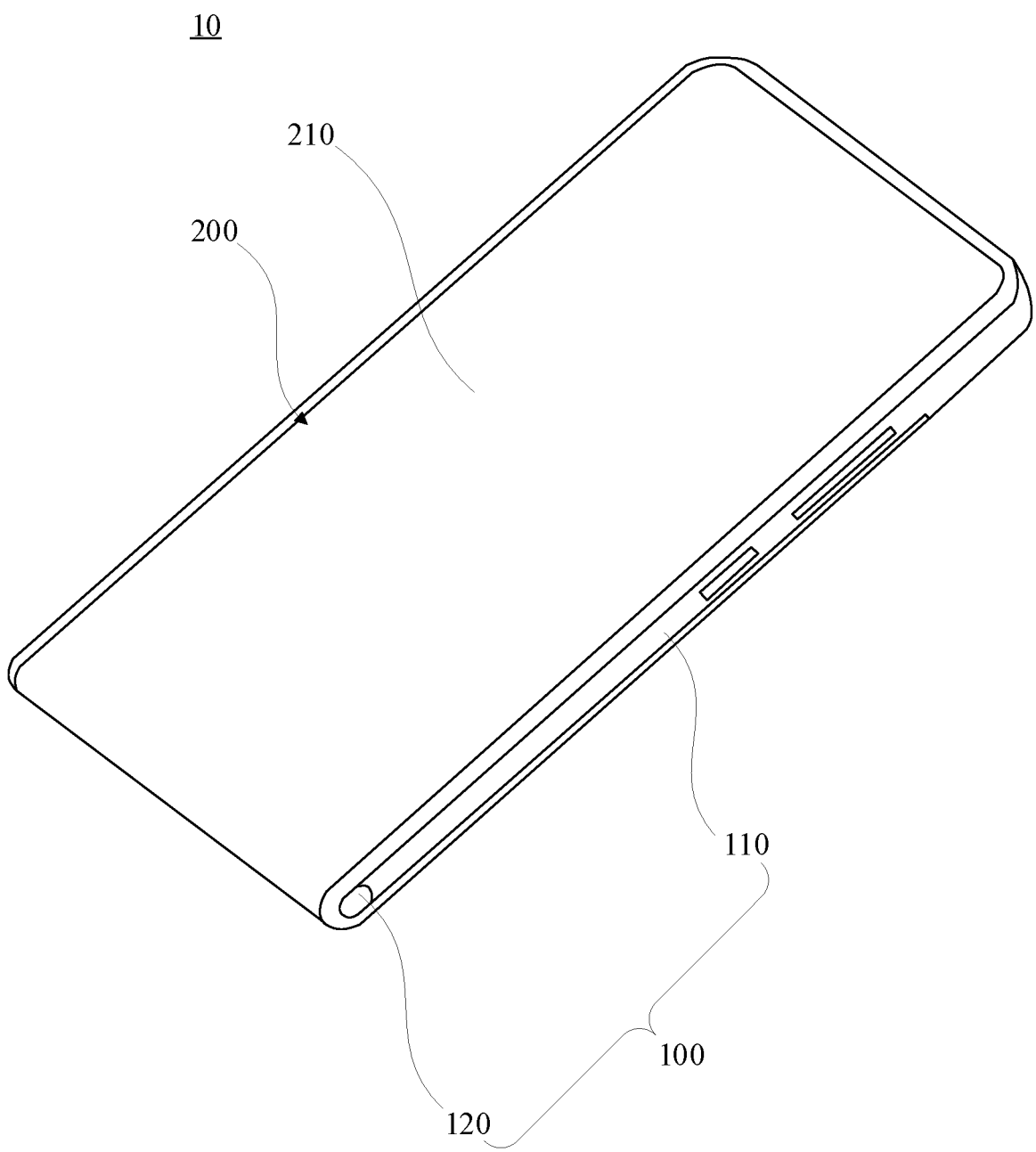
FIG. 4 is a schematic diagram of a three-dimensional structure diagram of an electronic device, according to an example embodiment.

FIG. 4 is a schematic diagram showing a front-side view of an electronic device in a retracted state 10. The electronic device can include touch buttons on main body 110 (as shown in figure).

The flexible display 200 may be switched between a retracted state 10 and a sliding-out state 20. As described above, in FIGS. 1-4, the flexible display 200 is in the retracted state, and in FIGS. 5 through 8, the flexible display 200 is in the sliding-out state 20. When the flexible display 200 is in the retracted state 10, the first display portion 210 covers the first surface 101 and the lateral surface 103, and the second display portion 220 covers at least part of the second surface 102. When the flexible display 200 is switched from the retracted state 10 to the sliding-out state 20, the first display portion 210 slides along a direction where a free end 211 thereof may get close to the lateral surface 103 to expose a hidden region 104 of the first surface 101.

Figure 5:
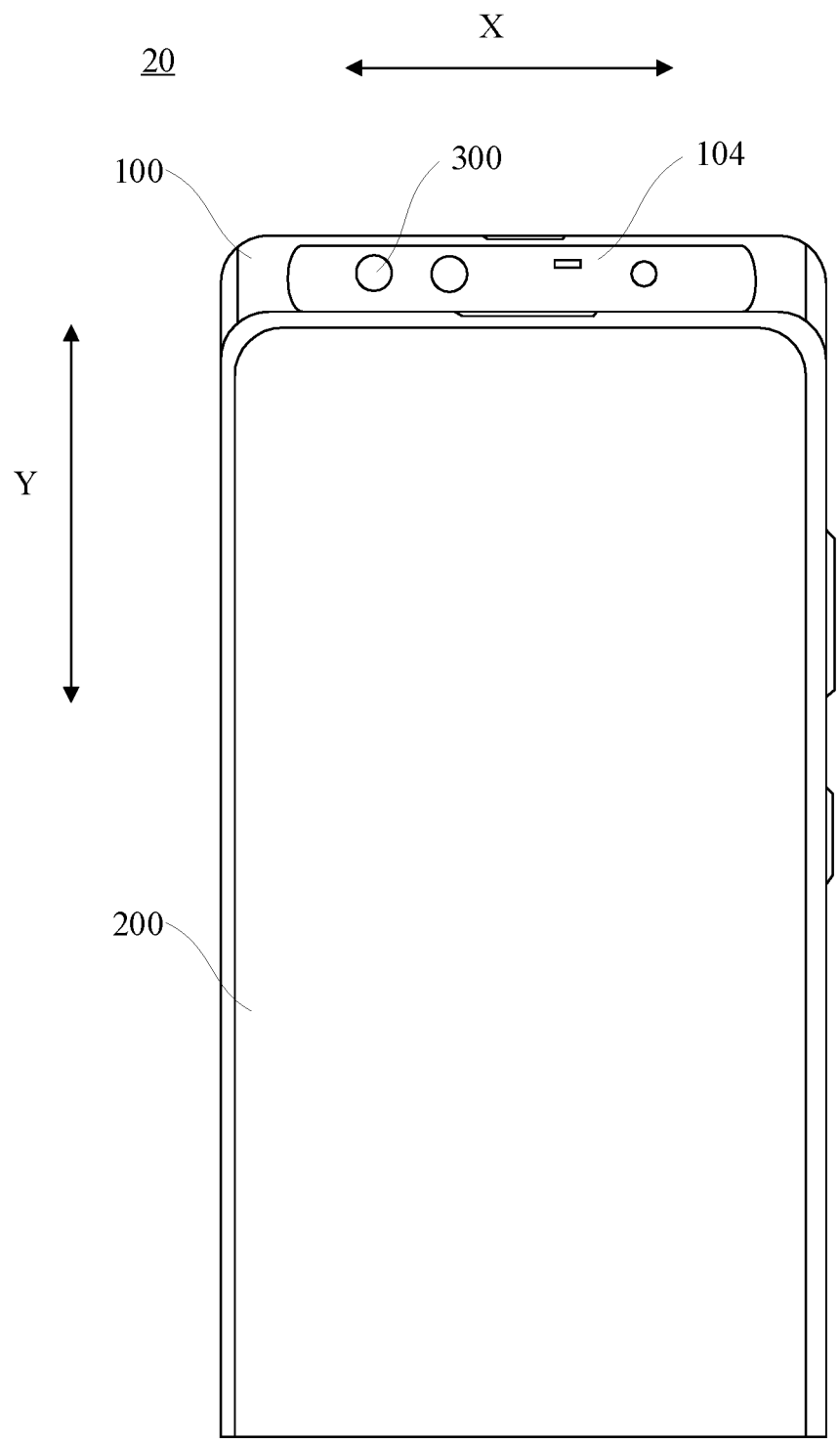
FIG. 5 is a schematic diagram of a front view of an electronic device, according to an example embodiment.

FIG. 5 is a schematic diagram showing a front view of an electronic device in a sliding-out state 20. A camera 300 is arranged in the hidden region 104. Similarly, other functional components such as an ambient light sensor, a distance sensor, a dot matrix projector, and a receiver may also be arranged in the hidden region 104. One or more of the functional components may be selected according to a practical requirement for arrangement.

Figure 6:
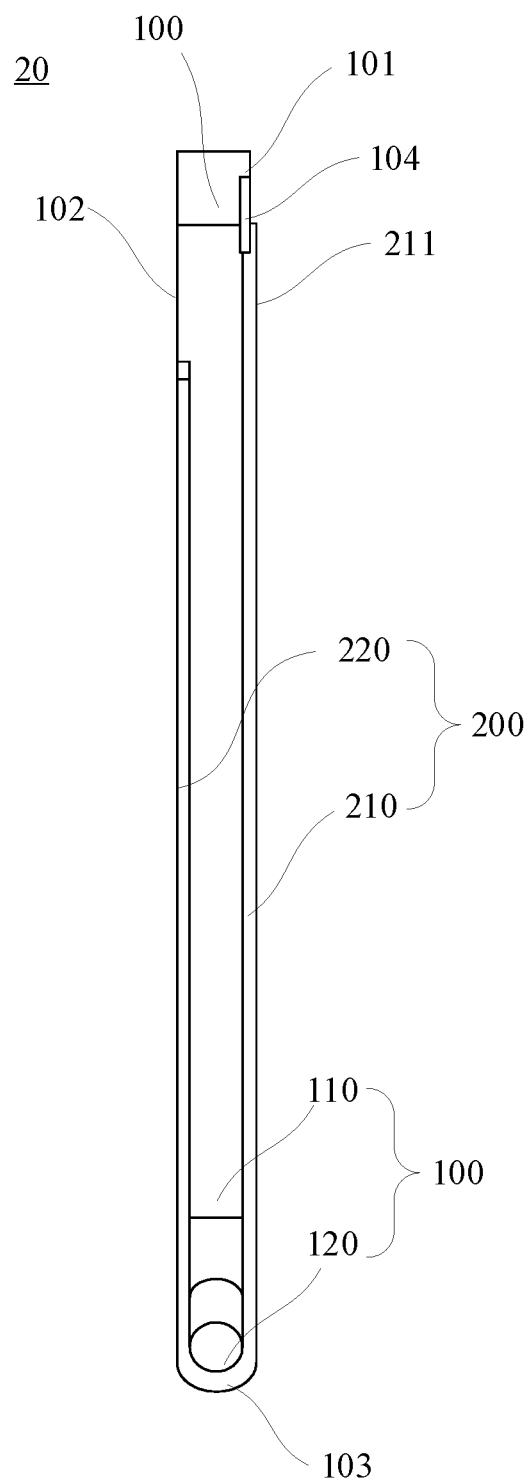
FIG. 6 is a schematic diagram of a side view of an electronic device, according to an example embodiment.

FIG. 6 is a schematic diagram showing a side view of an electronic device in a sliding-out state 20.

Figure 7:
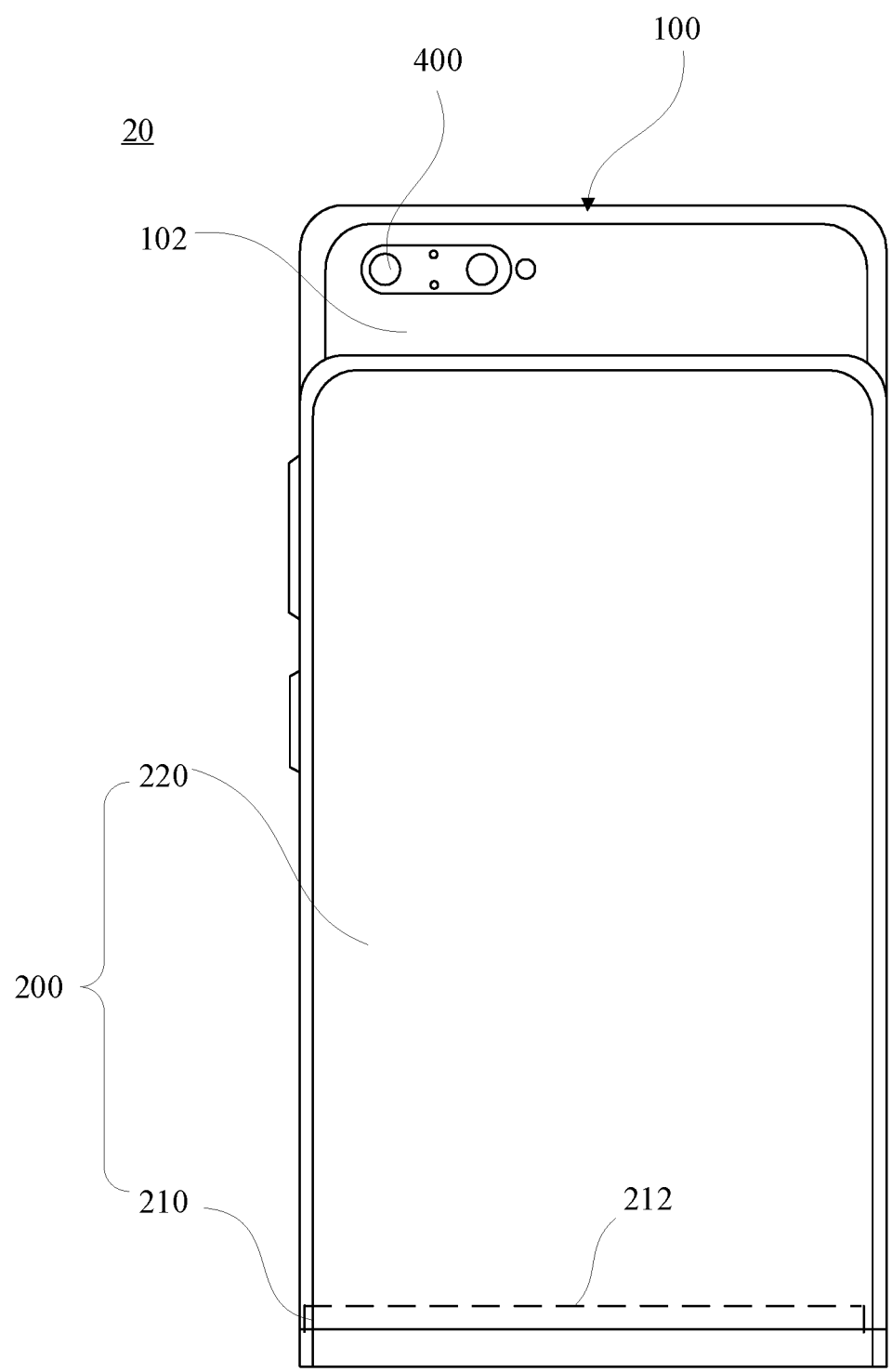
FIG. 7 is a schematic diagram of a rear view of an electronic device, according to an example embodiment.

FIG. 7 is a schematic diagram showing a back view of an electronic device in a sliding-out state 20. A dash box 212 is the compensation space of the second surface 102 of the body 100 (further described below).

Figure 8:
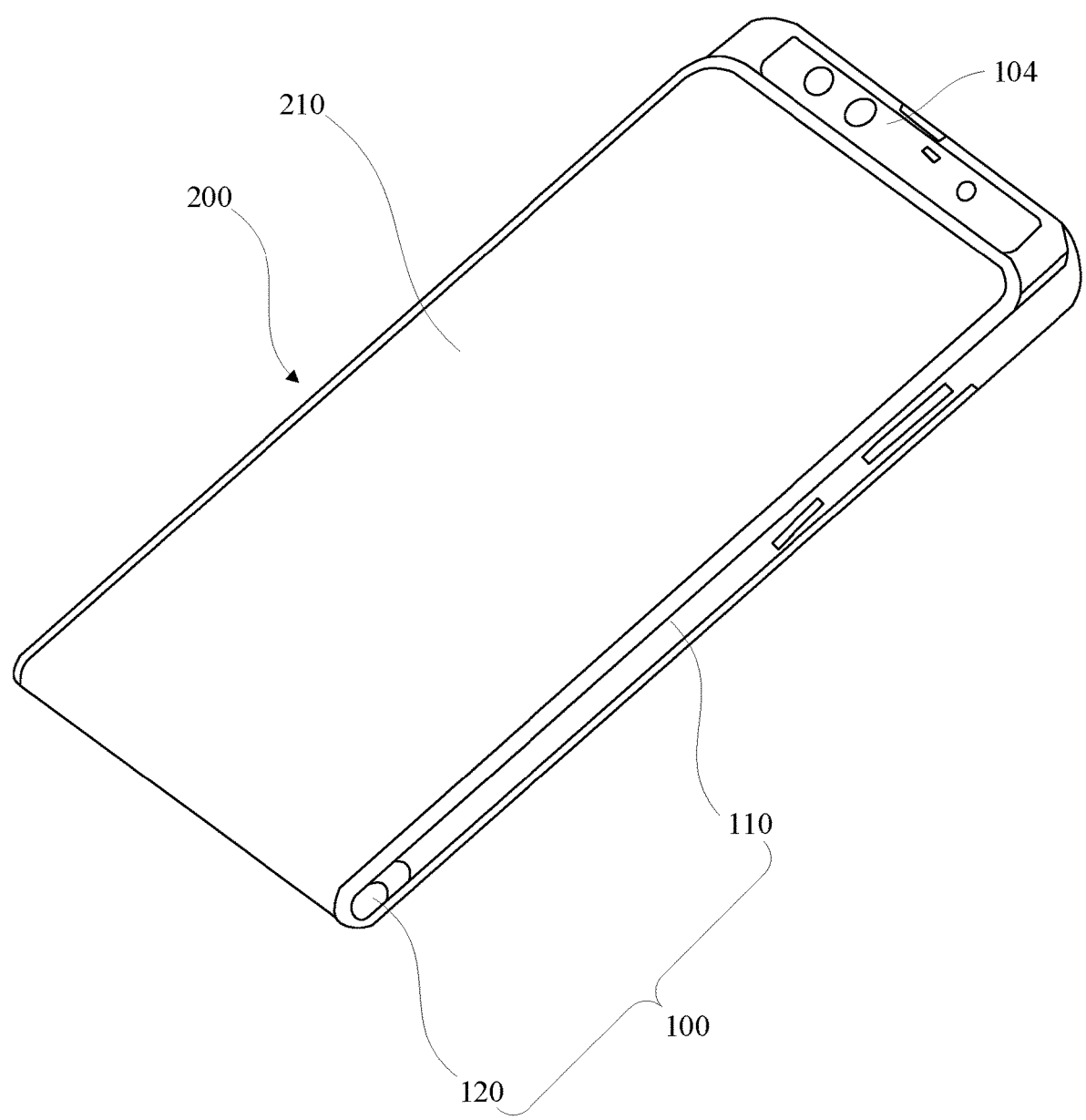
FIG. 8 is a schematic diagram of a three-dimensional structure diagram of an electronic device, according to an example embodiment.

FIG. 8 is a schematic diagram showing a front-side view of an electronic device in a sliding-out state 20.

In the embodiment, the receiver is arranged at a junction of the first surface 101 and an upper surface of the body 100. When the flexible display 200 of the electronic device is in the retracted state 10, the flexible display 200 may not affect the use of the receiver, and meanwhile, a screen-to-body ratio of the first surface 101 is increased.

It is to be noted that, in the embodiment, the first surface 101 is a front surface of the body 100, the second surface 102 is a back surface of the body 100, the lateral surface 103 is a lower surface of the body 100 and the upper surface mentioned above is a surface, opposite to the lateral surface 103, of the body 100. In such a case, a sliding direction of the flexible display 200 is a length direction Y of the electronic device, and when the flexible display 200 is switched from the retracted state 10 to the sliding-out state 20, an upper portion of the first surface 101 is exposed. In other embodiments, the lateral surface 103 may be the upper surface of the body 100, and when the flexible display 200 is switched from the retracted state 10 to the sliding-out state 20, a lower portion of the first surface 101 is exposed.

Figure 9:
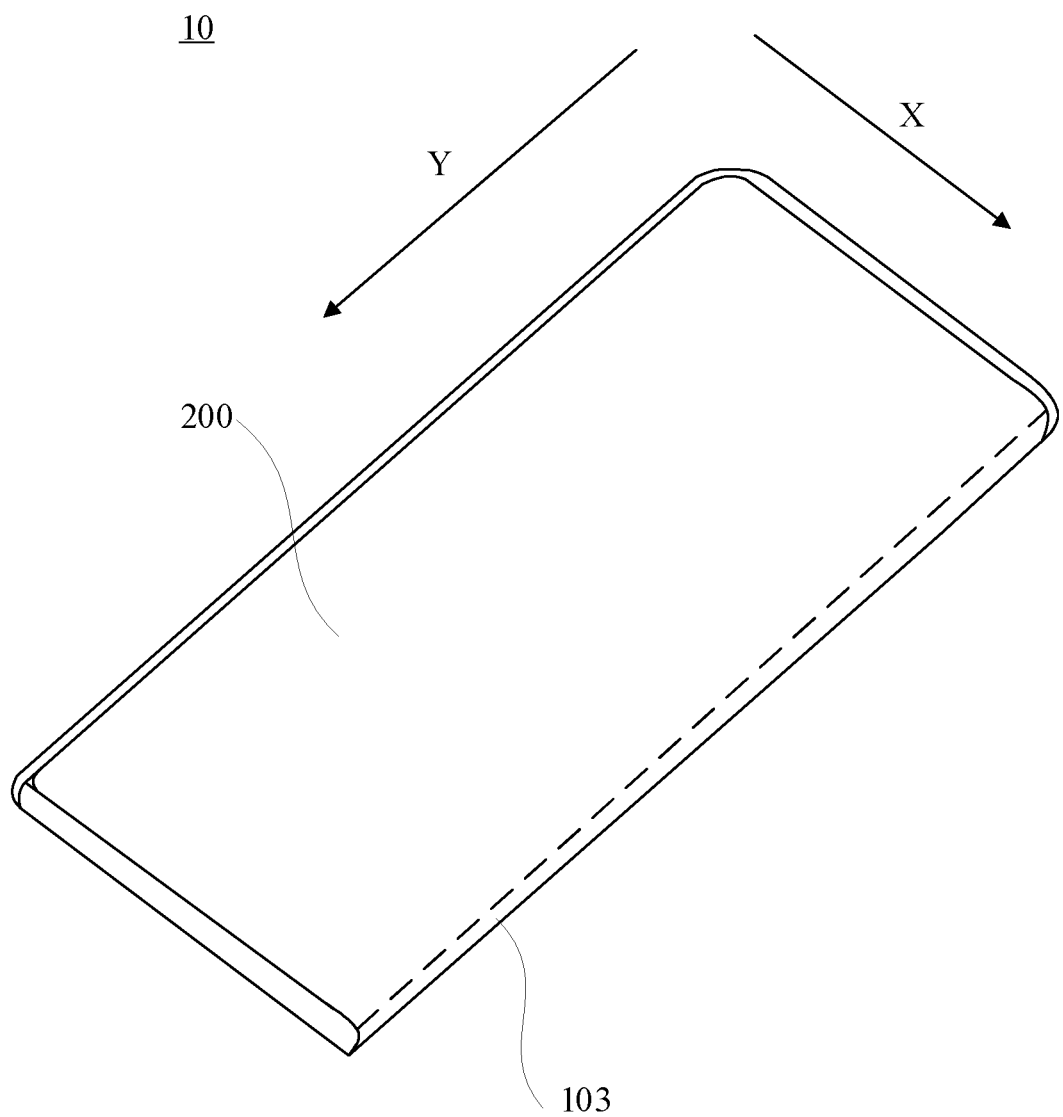
FIG. 9 is a schematic diagram of a three-dimensional structure of an electronic device, according to an example embodiment.
Figure 10:
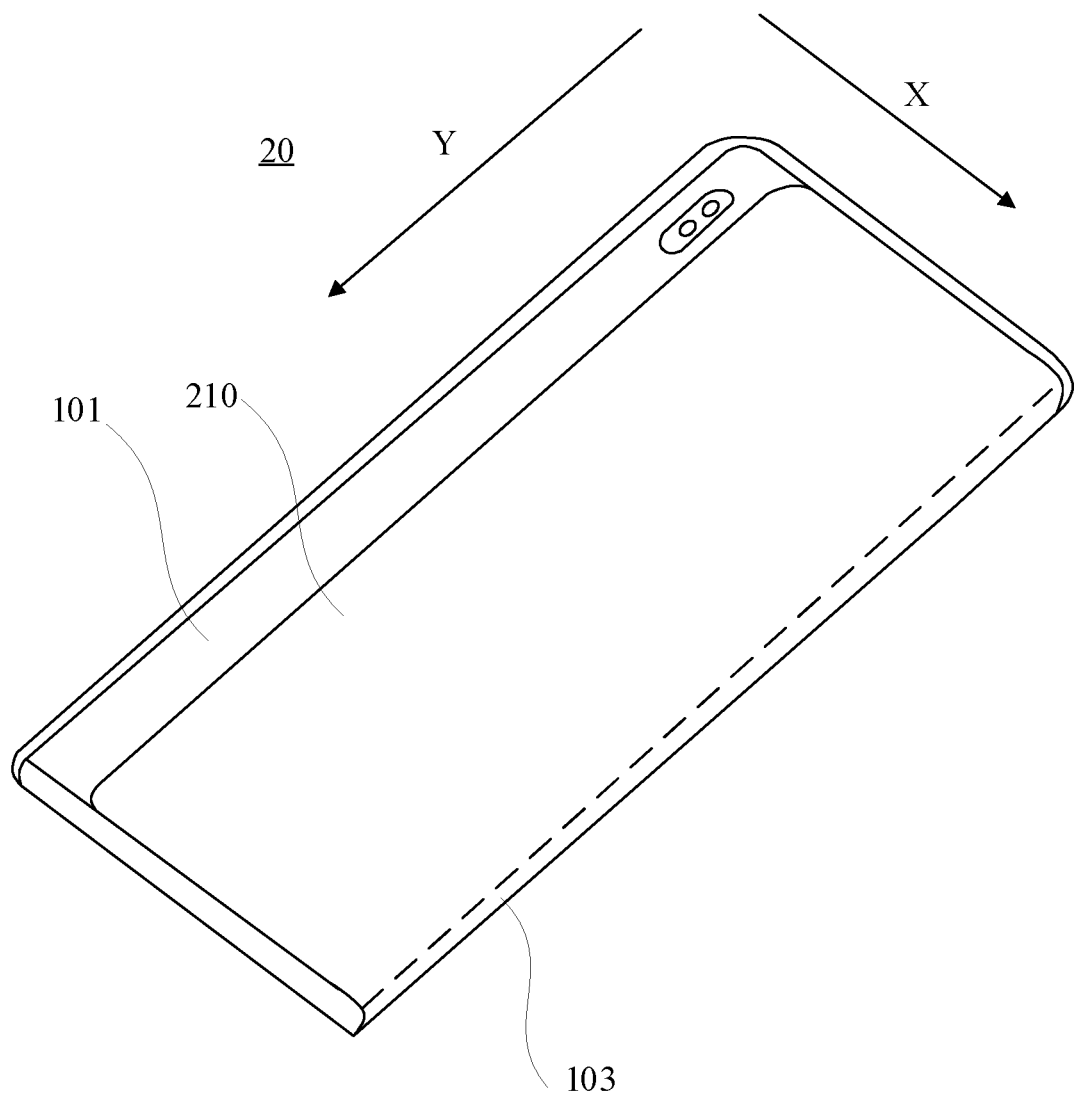
FIG. 10 is a schematic diagram of a three-dimensional structure of an electronic device, according to an example embodiment.

Alternatively, as shown in FIG. 9 and FIG. 10, the lateral surface 103 may also be surfaces on the left and right sides of the body 100. FIG. 9 is a schematic diagram showing a back-side view of an electronic device in a retracted state 10. FIG. 10 is a schematic diagram showing a back-side view of an electronic device in a sliding-out state 20. In such case, the sliding direction of the flexible display 200 is a width direction X of the electronic device, and when the flexible display 200 is switched from the retracted state 10 to the sliding-out state 20, a left side or right side of the first surface 101 is at least partially exposed.

In such an arrangement as described above, the flexible display 200 covers all the three surfaces of the electronic device, and the hidden region 104, for mounting the functional components, of the first surface 101 is enabled to be exposed by state switching of the flexible display 200, so that a space occupied by the functional components is reduced, and meanwhile, a screen-to-body ratio of the electronic device is maximally increased.

When the flexible display 200 is in the retracted state 10, the moving body 120 is pressed against the main body 110, and the first display portion 210 covers the first surface 101 and the lateral surface 103. When the flexible display 200 is in the sliding-out state 20, the moving body 120 is separated from the main body 110, and at least part of the first display portion 210 still covers a portion, far away from the hidden region 104, of the first surface 101 of the main body 110 and covers the lateral surface 103 of the moving body 120.

When a user needs to use the functional component in the hidden region 104, a state of the flexible display 200 may be changed and switched from the retracted state 10 to the sliding-out state 20 to expose the hidden region 104. In such case, a size of the body 100 in the length direction Y is enlarged, namely a length of the first surface 101 of the body 100 is increased, at least part of the first display portion 210 moves downwards to compensate a length increment of the first surface 101 and expose the corresponding hidden region 104. In such an arrangement as described above, the size of the first display portion 210 of the first surface 101 may be prevented from being changed excessively by state switching of the electronic device. That is, exposure of the functional component is ensured, and meanwhile, a relatively screen-to-body ratio of the first surface 101 is ensured.

Furthermore, the body 100 is provided with a first sliding rail (not shown) on the first surface 101, and the first display portion 210 is mounted on a bracket (not shown) and slides along the first sliding rail through the bracket to switch the flexible display 200 between the retracted state 10 and the sliding-out state 20. A first rack may be arranged on the first sliding rail, a second rack may be arranged at a position, facing the first rack, on the bracket, a meshed gear (not shown) may be arranged between the first rack and the second rack, and the gear may be fixedly connected with the main body 110. When the first display portion 210 slides along the direction where the free end thereof gets close to the lateral surface 103, the first display portion 210 drives the bracket to move towards a direction of getting close to the lateral surface 103 relative to the body 100. In such case, the gear meshed between the first rack of the body 100 and the second rack of the bracket moves downwards under acting forces of the body 100 and the bracket to drive the moving body 120 to move towards a direction of getting far away from the main body 110 to increase a length of the body 100.

For reducing wear between the first display portion 210 and the moving body 120, a flexible backing layer (not shown) may be additionally arranged at a junction of the first display portion 210 and the moving body 120. The flexible backing layer may be a material such as rubber.

In such a structure as described above, when the flexible display 200 is switched from the retracted state 10 to the sliding-out state 20, namely when the free end 211 of the first display portion 210 moves downwards, the moving body 120 moves towards the direction of getting far away from the main body 110, and a ratio of a movement distance of the moving body 120 to a movement distance of the free end 211 of the first display portion 210 is ½, namely a movement velocity of the moving body 120 is ½ of a movement velocity of the free end 211 of the first display portion 210. In such a case, the lengths of the first surface 101 of the body 100 and the second surface 102 of the body 100 are increased. A portion, far away from the second display portion 220, of the first display portion 210 moves downwards to compensate for the length increment of the first surface 102 and, meanwhile, the hidden region 104 of the first surface 101 is exposed. A portion, close to the second display portion 102, of the first display portion 220 moves upwards and extends to the second surface 102, and the portion, dashed box 212 in FIG. 7, may compensate a length increment of the second surface 102 of the body 100. The portion may only be at least part of the first display portion 210 covering the lateral surface 103 in the retracted state 10 or may include at least part of the first display portion 210 covering the first surface 101 in the retracted state 10. The portion which may be regulated according to a movement distance of the flexible display 200, and there are no limits made thereto herein. Those skilled in the art may know very well that, in such an arrangement, the movement velocity of the moving body 120 is matched with a sliding velocity of the first display portion 210 to keep the first display portion 210 structurally fitted with the moving body 120, and moreover, the first display portion 210 and the second display portion 220 are prevented from deformation including wrinkling, stretching and the like caused by a length change of the body 100.

In other embodiments, the moving body 120 may match with the sliding velocity of the first display portion 210 through other structures.

As shown in FIG. 4 and FIG. 8, the moving body 120 has a cylindrical structure, and the surface, facing the moving body 120, of the main body 110 is sunken inwards to form a cambered surface matched with the moving body 120. In such an arrangement, the moving body 120 and the main body 110 may be smoothly connected to avoid the flexible display 200 which covers the moving body 120 and the main body 110 from appearing at a stress concentrated position and thus prolong the service life of the flexible display 200.

Furthermore, when the flexible display 200 is switched from the retracted state 10 to the sliding-out state 120, the second display portion 220 and the second surface 102 may be kept relatively static. In such an arrangement, movement of the second display portion 220 is reduced to lower wear to the second display portion 220 and prolong service life thereof. In addition, a functional component may further be arranged at an upper portion of the second surface 102, and the second display portion 220 may be kept static to ensure a maximum screen-to-body ratio and simultaneously avoid the functional component at the upper portion of the second surface 102 from being covered. In the embodiment, the functional component arranged on the second surface 102 includes a rear camera module 400, a luminous module and the like.

Figure 11:
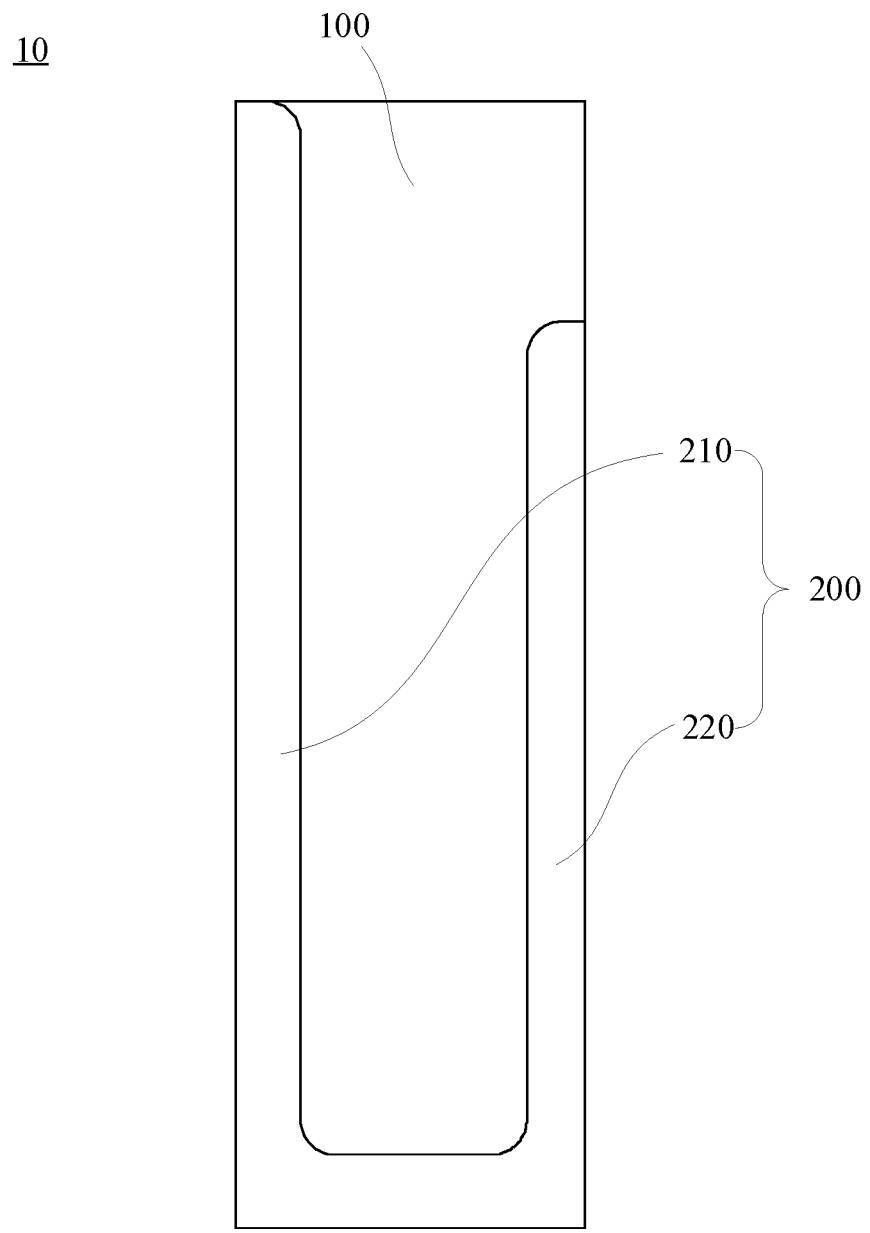
FIG. 11 is a schematic structure diagram of an electronic device, according to an example embodiment.
Figure 12:
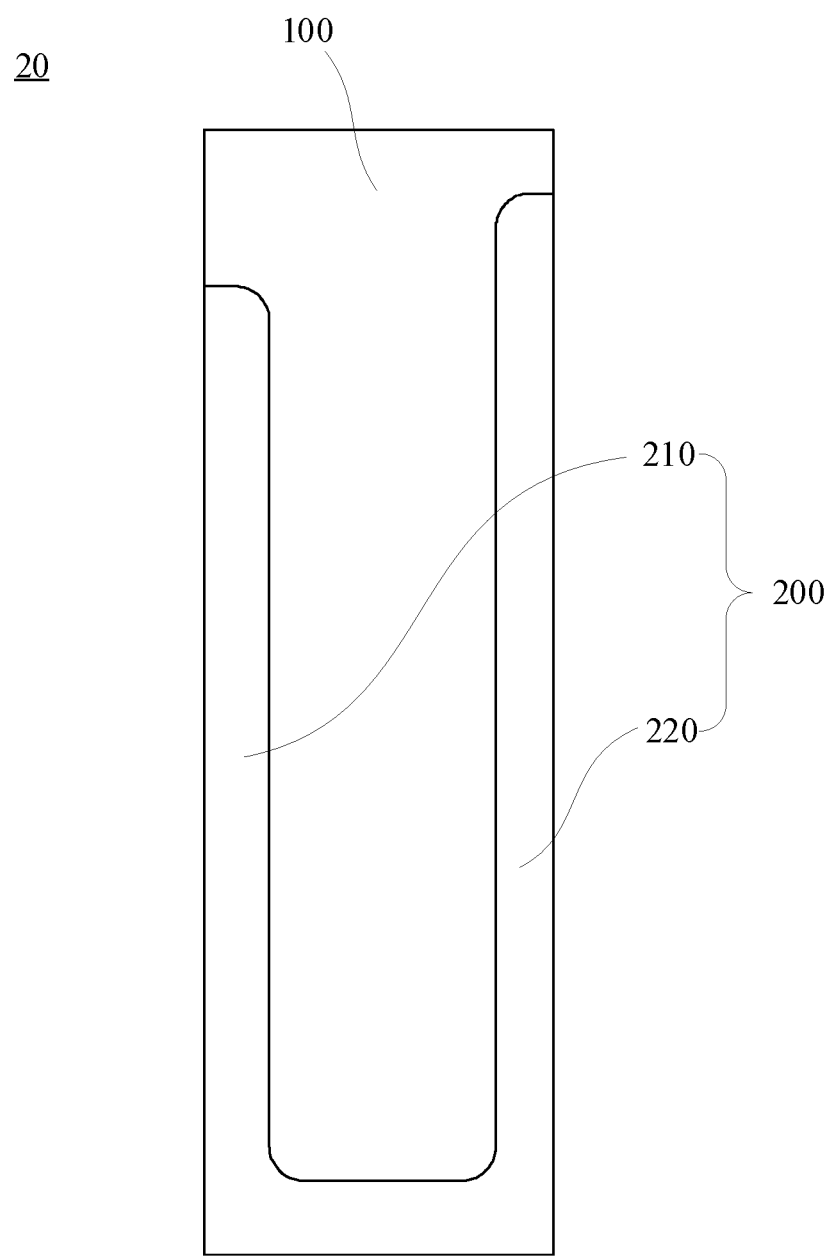
FIG. 12 is a schematic structure diagram of an electronic device, according to an example embodiment.

In other embodiments, when the flexible display 200 is moved between the retracted state 10 and the sliding-out state 20, the second display portion 220 may also move relative to the second surface 102. FIG. 9 is a schematic diagram showing a side view of an electronic device in a retracted state 10. FIG. 9 is a schematic diagram showing a side view of an electronic device in a sliding-out state 20. As shown in FIG. 11 and FIG. 12, when the flexible display 200 is switched from the retracted state 10 to the sliding-out state 20, the portion, close to the second display portion 220, of the first display portion 210 moves upwards and extends to the second surface 102, and the second display portion 220 moves along with movement of the first display portion 210, namely the second display portion 220 moves along a direction where a free end thereof may get far away from the lateral surface 103. In such an arrangement, when the hidden region 104 of the first surface 101 is exposed, an area, covered by the flexible display 200, of the second surface 102 is large, namely the second surface 102 is covered with the second display portion 220 and at least part of the first display portion 210. Therefore, a screen-to-body ratio of the second surface 102 is increased, and the structure is simple. Since the second display portion 220 follows the first display portion, a movement distance of the first display portion 210 is equal to a movement distance of the second display portion 220. In such an arrangement, the flexible display screen may be kept fitting with the surface of the body 100, and meanwhile, a first display screen may maximally move to the second surface 102 of the body 100 to increase the screen-to-body ratio of the second surface 102.

In addition, the electronic device may further include a driving circuit (not shown) and a control circuit (not shown). The driving circuit may drive the flexible display 200 to be switched between the retracted state and the sliding-out state. In the embodiment, the driving circuit is connected with the first display portion 210 and drives the first display portion 210 to move to drive the flexible display 200 to be switched between the two states. The control circuit is electrically connected with the driving circuit to drive the driving circuit to move.

The electronic device may implement touch detection, thrust detection and the like, and the control circuit may detect an operation of a user such as touch and pushing over a screen module to determine whether to drive the driving circuit to move to assist the user in completing the state switching of the flexible display 200 or not. Alternatively, the electronic device may also detect clicking of a functional button on the screen by a user, for example, selfie or unlocking, and the control circuit may judge whether to drive the driving circuit to move to expose the functional component in the hidden region 104 or not. Alternatively, the electronic device may further detect a control instruction sent by a user, for example, a voice content related to selfie or unlocking, and the control circuit may judge whether to drive the driving circuit to move to expose the functional component in the hidden region 104 or not.

In such an arrangement as described above, the electronic device may implement automatic control over the flexible display 200. The electronic device may also switch the state of the flexible display 200 via manual control only, or, the electronic device may further switch the state of the flexible display 200 by combining manual control and electric control. Here, there are no limits made thereto.

Furthermore, a magnetic force may act between the bracket and the first surface 101 to switch the flexible display 200 from the retracted state 10 to the sliding-out state 20 or from the sliding-out state 20 to the retracted state 10. Specifically, magnets (not shown) with the same magnetism are arranged on the bracket and the first surface 101 of the body 100. When the flexible display 200 is switched between the retracted state 10 and the sliding-out state 20, the two magnets may get close to each other under the action of an external force and get far away from each other under the action of the magnetic force. When the flexible display 200 is at a middle position between the retracted state 10 and the sliding-out state 20, the magnet on the bracket is opposite to the magnet on the body 100. In such a case, a repulsive force between the body 100 and the bracket reaches a maximum value. When the first display portion 210 slides over the middle position along the direction where the free end thereof may get close to the lateral surface 103, the first display portion 210 may rapidly move to the sliding-out state 20 under the action of the repulsive force of the two magnets; or, when the first display portion 210 slides over the middle portion along a direction where the free end may get far away from the lateral surface 103, the first display portion 210 may rapidly move to the retracted state 10 under the action of the repulsive force of the two magnets.

In such an arrangement as described above, when a user manually pushes the flexible display 200, once the first display portion 210 slides over the middle position, the first display portion 210 may rapidly move in position under the action of the magnetic force, so that user experience is improved.

The above are only embodiments of the present disclosure and not intended to limit the present disclosure in any form. The present disclosure is described above with the embodiments but not limited thereto. Those skilled in the art may make some modifications or changes by use of the technical contents without departing from the scope of the present disclosure to obtain equivalent embodiments. However, any simple modifications, equivalent variations, and modifications made to the above embodiments according to the technical essence of the present disclosure without departing from the contents of the present disclosure shall fall within the scope of the present disclosure.

What is claimed is:

1. An electronic device, comprising:
   a body, comprising a first surface, a second surface, and a lateral surface, wherein the first surface and the second surface are opposite to each other, wherein the lateral surface is adjacent to the first surface and the second surface; and
   a flexible display, comprising a first display portion and a second display portion that are integrated, wherein the flexible display is configured to move between a retracted state and a sliding-out state,
   wherein, when the flexible display is in the retracted state, the first display portion covers the first surface and the lateral surface, and the second display portion is covers at least part of the second surface;
   when the flexible display is moved from the retracted state to the sliding-out state, the first display portion slides along a direction where a free end thereof moves toward the lateral surface to expose a hidden region of the first surface;
   wherein, when the flexible display is switched from the retracted state to the sliding-out state, the second display portion and the second surface are kept relatively static and
   wherein the body comprises:
   a main body, wherein the first surface and the second surface form the main body; and
   a moving body, wherein the moving body is adjacent to the main body and has a lateral surface,
   wherein, when the flexible display is in the retracted state, the moving body is adjacent to the main body; and when the flexible display is in the sliding-out state, the moving body is separated from the main body.

2. The electronic device of claim 1, wherein a movement velocity of the moving body is matched with a sliding velocity of the first display portion to move the first display portion evenly with the moving body.

3. The electronic device of claim 1, wherein the moving body has a cylindrical structure and the main body has a surface that is sunken inwards to form a cambered surface matched with the moving body, wherein the surface is facing the moving body.

4. The electronic device of claim 1, wherein, when the flexible display is switched from the retracted state to the sliding-out state, the second display portion moves along a direction where a free end thereof is capable of moving away from the lateral surface.

5. The electronic device of claim 4, wherein a movement distance of the first display portion is equal to a movement distance of the second display portion.

6. The electronic device of claim 1, wherein a sliding direction of the flexible display is a length direction or width direction of the electronic device.

7. The electronic device of claim 1, wherein at least one of following functional components is arranged in the hidden region: a camera, an ambient light sensor, a distance sensor, a dot matrix projector and a receiver.

8. The electronic device of claim 1, further comprising:
   a driving circuit, capable of driving the flexible display to move between the retracted state and the sliding-out state; and
   a control circuit, coupled to the driving circuit to drive the driving circuit to move.

9. The electronic device of claim 1, wherein a sliding direction of the flexible display is a length direction or width direction of the electronic device.

10. The electronic device of claim 1, wherein a sliding direction of the flexible display is a length direction or width direction of the electronic device.

11. The electronic device of claim 2, wherein a sliding direction of the flexible display is a length direction or width direction of the electronic device.

12. The electronic device of claim 3, wherein a sliding direction of the flexible display is a length direction or width direction of the electronic device.

13. The electronic device of claim 1, wherein at least one of following functional components is arranged in the hidden region: a camera, an ambient light sensor, a distance sensor, a dot matrix projector and a receiver.

14. The electronic device of claim 1, wherein at least one of following functional components is arranged in the hidden region: a camera, an ambient light sensor, a distance sensor, a dot matrix projector and a receiver.

15. The electronic device of claim 2, wherein at least one of following functional components is arranged in the hidden region: a camera, an ambient light sensor, a distance sensor, a dot matrix projector and a receiver.

16. The electronic device of claim 1, further comprising:
a driving circuit, capable of driving the flexible display to switch between the retracted state and the sliding-out state; and
a control circuit, electrically connectable with the driving circuit to drive the driving circuit to move.

17. The electronic device of claim 1, further comprising:
a driving circuit, capable of driving the flexible display to switch between the retracted state and the sliding-out state; and
a control circuit, electrically connectable with the driving circuit to drive the driving circuit to move.

18. The electronic device of claim 2, further comprising:
a driving circuit, capable of driving the flexible display to move between the retracted state and the sliding-out state; and
a control circuit, coupled to the driving circuit to drive the driving circuit to move.

* * * * *